United States Patent [19]
Russ et al.

[11] Patent Number: 5,744,622
[45] Date of Patent: Apr. 28, 1998

[54] WATER-SOLUBLE, FIBER-REACTIVE ANTHRAQUINONE COMPOUNDS

[75] Inventors: Werner Hubert Russ, Flörsheim; Christian Schumacher, Frankfurt am Main, both of Germany

[73] Assignee: Hoechst Aktiengesellschaft, Germany

[21] Appl. No.: 571,573

[22] Filed: Dec. 13, 1995

[30] Foreign Application Priority Data

Dec. 15, 1994 [DE] Germany .................. 44 44 692.6

[51] Int. Cl.$^6$ .................. C09B 1/24; C09B 1/34
[52] U.S. Cl. .................. 552/232; 552/224
[58] Field of Search .................. 552/221, 225, 552/226, 228, 230, 231, 224, 227, 232, 233, 235, 238, 250, 251, 255, 256, 257, 258, 259, 260, 249

[56] References Cited

U.S. PATENT DOCUMENTS

| | | | |
|---|---|---|---|
| 3,920,632 | 11/1975 | Hohmann et al. | 260/239.3 T |
| 4,514,187 | 4/1985 | Schutz et al. | 260/371 |
| 5,183,501 | 2/1993 | Kawashita et al. | 534/751 |

FOREIGN PATENT DOCUMENTS

| | | | |
|---|---|---|---|
| A 0355492 | 2/1990 | European Pat. Off. | C09B 62/503 |
| A 0629667 | 12/1994 | European Pat. Off. | C09B 62/503 |
| 1103886 | 4/1961 | Germany . | |
| 929588 | 6/1963 | United Kingdom . | |

OTHER PUBLICATIONS

A. H. M. Renfrew, "Reactive Dyes for Cellulose: Replacement of Anthraquinone Blues by Triphenodioxazines", Rev. Prog. Coloration, vol. 15, 1985, pp. 15–20.

*Primary Examiner*—José G. Dees
*Assistant Examiner*—Barbara Badio
*Attorney, Agent, or Firm*—Connolly & Hutz

[57] ABSTRACT

The invention relates to anthraquinone compounds of the formula (1)

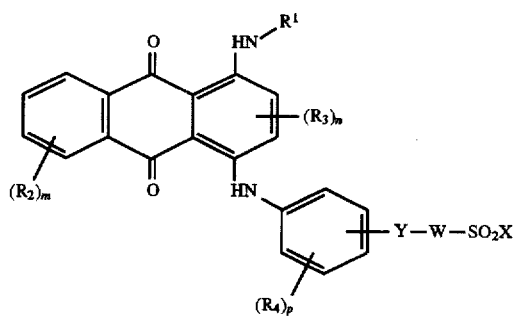

wherein the substituents are as defined in the specification. The compounds of formula (1) are water-soluble, fiber-reactive dyes useful for dyeing and printing materials, in particular fiber materials containing hydroxy, mecapto, amino and/or carboxamide groups.

8 Claims, No Drawings

WATER-SOLUBLE, FIBER-REACTIVE ANTHRAQUINONE COMPOUNDS

The present invention relates to the technical field of anthraquinoid fiber-reactive dyestuffs.

Anthraquinone dyestuffs are described in numerous instances in the literature. They are distinguished by their brilliance, good light-fastnesses and the stability of the chromophore under both acid and alkaline conditions. However, they have the disadvantage of high raw material costs and a comparatively low molar extinction. For this reason, it is important for dyeing and printing substrates that the dyestuffs not only have superior fastness properties and improved process characteristics but also give competitive costs.

Almost all the important anthraquinonoid reactive dyestuffs are derivatives of bromamine acid. This is usually reacted with a fiber-reactive amine component, it being possible for the fiber-reactive group to be linked to the amino group via aliphatic or more often via aromatic bridge members (A. H. M. Renfrew, Rev. Prog. Color. Relat. Top. 15 (1985) 15).

One of the most important known reactive dyestuffs for the production of brilliant, fast blue reactive dyeings on textiles is C.I. Reactive Blue 19 of the formula (A) which was mentioned for the first time in DE-A-965 902. The course of the synthesis has been described in numerous instances in the literature.

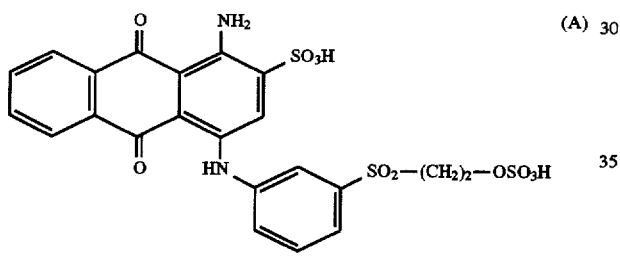

(A)

The known anthraquinone dyestuffs usually have the disadvantage of an expensive synthesis, the product and space/time yield being unsatisfactory.

The object of the present invention was to provide novel brilliant blue anthraquinone dyestuffs with high fastnesses and fixing yields, which overcome the disadvantages mentioned for the prior art.

It has been found that the compounds of the formula (1) defined below surprisingly meet the requirements imposed.

The present invention relates to anthraquinone compounds of the formula (1)

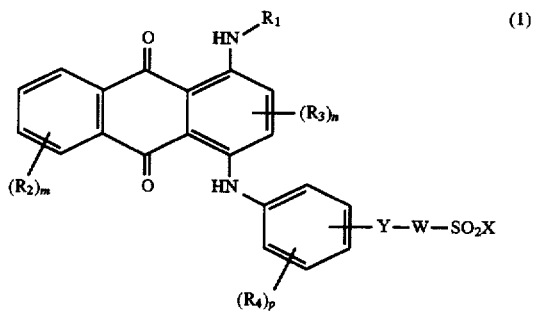

(1)

in which $R^1$ is hydrogen, $C_1$–$C_6$-alkyl-carbonyl, $C_6$-arylcarbonyl, $C_1$–$C_4$-alkylphenylcarbonyl, $C_1$–$C_6$-alkyl, $C_3$–$C_6$-cycloalkyl or phenyl, where $C_1$–$C_6$-alkyl, $C_3$–$C_6$-cycloalkyl and phenyl can be substituted by one or more radicals from the group consisting of hydroxyl, sulfo, carboxyl, $C_1$–$C_4$-alkyl, $C_1$–$C_4$-alkoxy, halogen, cyano, amino and nitro;

$R^2$ is sulfo or carboxyl;

m is a number from 0 to 2;

$R^3$ is sulfo, carboxyl or halogen, such as chlorine or bromine;

n is the number 0 or 1;

$R^4$ is sulfo, carboxyl, $C_1$–$C_4$-alkyl or $C_1$–$C_4$-alkoxy;

p is a number from 0 to 2;

W is a $C_1$–$C_6$-alkylene group;

X is vinyl or —$CH_2CH_2$—L, in which L is a group which can be split off under alkaline conditions; and Y is a bridge member of the formula —O— or —NH— with the proviso that W is a $C_3$–$C_6$-alkylene group if X is vinyl and at the same time Y is —NH—.

Compounds which are preferred in the context of the present invention are those of the formula (1) in which $R^1$ is hydrogen, $C_1$–$C_4$-alkyl, $C_5$–$C_6$-cycloalkyl, acetyl, benzoyl, phenyl or methylphenyl-carbonyl, or $C_1$–$C_4$-alkyl, $C_5$–$C_6$-cycloalkyl or phenyl which are substituted by 1 to 3 radicals from the group consisting of hydroxyl, sulfo, carboxyl, methyl, ethyl, methoxy, ethoxy, fluorine, chlorine, bromine, cyano or nitro.

Compounds which are furthermore preferred are those of the formula (1) in which $R^3$ is a sulfo group in the ortho-position relative to the NH—$R^1$ group.

Compounds which are furthermore preferred are those of the formula (1) in which $R^4$ is sulfo, carboxyl, methyl, ethyl, methoxy or ethoxy.

Compounds which are furthermore preferred are those of the formula (1) in which

W is $C_2$–$C_3$-alkylene, preferably 1,2-ethylene or 1,3-propylene.

Compounds which are furthermore preferred are those of the formula (1) in which

L is chlorine, bromine, —$OSO_3M$, —$SSO_3M$, —$OPO_3M_2$, preferably —$OSO_3M$ or chlorine, in which M is hydrogen or an alkali metal.

Compounds which are furthermore preferred are those of the formula (1) in which m is the number 0;

n is the number 1 and p is the number 0 or 1.

Compounds which are furthermore preferred are those of the formula (1) in which the radical —Y—W—$SO_2X$ is in the meta- or para-position, particularly preferably in the para-position, relative to the NH group of the phenyl ring.

Particularly preferred dyestuffs are compounds of the formula (1a) and (1b).

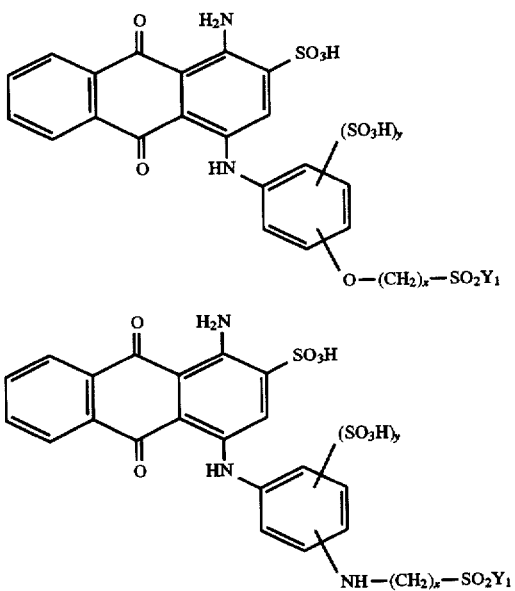

in which x is the number 2 or 3;

y is 0, 1 or 2, in particular 0 or 1; and $Y^1$ is β-sulfatoethyl, β-chloroethyl or vinyl, in particular β-sulfatoethyl, with the proviso for the compound of the formula (1b) that if $Y^1$ is vinyl x is the number 3.

The present invention does not relate to compounds of the formula (1) in which W is a methylene group or a 1,2-ethylene group, Y is the group —NH— and X at the same time is vinyl since the vinyl group in this structure of the —Y—W—SO$_2$X— chain very readily reacts intramolecularly with the —NH— group to form a heterocyclic 5- or 6-membered ring and is then no longer fiber-reactive.

The present invention furthermore relates to a process for the preparation of the anthraquinone dyestuffs (1) according to the invention which comprises reacting a compound of the formula (2)

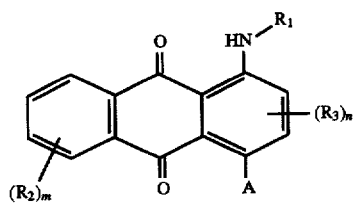

in which A is fluorine, chlorine, bromine, iodine, sulfo or nitro, but particularly preferably bromine, and the radicals $R^1$, $R^2$ and $R^3$ have one of the abovementioned meanings, with a compound of the formula (3)

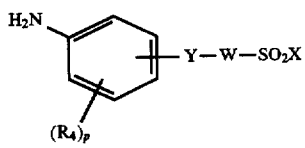

in which $R^4$, Y, W and p have one of the abovementioned meanings and X has one of the abovementioned meanings or is β-hydroxyethyl, in the presence of a copper compound.

Preferably, a catalytic amount, in particular from 1 to 5% by weight, based on the compound of the formula (2), of a copper(I) compound, preferably of a Cu(I) halide or Cu(I) pseudohalide, such as CuCl, CuBr, CuI or CuCN, is used here and the condensation is carried out at temperatures from 50° to 90° C., preferably 60° to 85° C., and at pH values from 6 to 10, preferably 7 to 9. The reaction is carried out in an aqueous or aqueous-organic medium in suspension or in solution. If the reaction is carried out in an aqueous-organic medium, the organic medium is, for example, acetone, dimethylformamide, dimethyl sulfoxide or N-methylpyrrolidone. The hydrogen halide acid which is liberated during the condensation is advantageously neutralized continuously by the addition of aqueous alkali metal hydroxides, carbonates, phosphates, silicates or bicarbonates. The ratios of the molar amounts of the compounds of the formula (2) and (3) are expediently 1:1 to 1:1.4.

In the case where X has one of the meanings given in formula (1), the reactive dyestuffs according to the invention are obtained during the condensation. In the case where X is β-hydroxyethyl, dyestuffs of the formula (4)

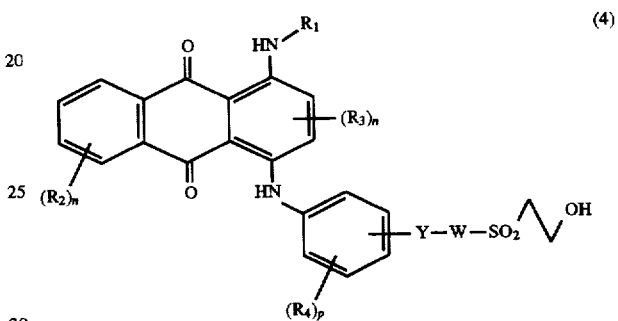

are obtained, and are converted into the reactive dyestuffs of the formula (1) according to the invention by a subsequent reaction step, in particular an esterification.

The preferred process variant is that in which the compounds of the formula (3) employed are those in which X is β-hydroxyethyl, and in a further process step the β-hydroxyethyl group is esterified to give the desired fiber-reactive group, for example the β-sulfatoethyl group.

Compounds of the formula (4) are novel and the present invention likewise relates to these.

In the case where $R^4$ is sulfo and p is 1 or 2, that variant in which a corresponding compound of the formula (3) which is free from sulfo groups (X=CH$_2$CH$_2$OH, p=0) is employed for the condensation reaction and the phenyl radical is then sulfonated simultaneously with the esterification of the β-hydroxyethyl group to the β-sulfatoethyl group, is furthermore preferred.

The anthraquinone compound of the formula (4) is esterified by the action of sulfuric acid comprising up to 60% by weight, preferably up to 25% by weight, of sulfur trioxide, or by a halosulfonic acid, such as chlorosulfonic acid, or by phosphoric acid. In the case where X in formula (4) is —SSO$_3$M, a compound of the formula (3) in which X is vinyl is used as starting substance and is reacted with sodium thiosulfate by an addition reaction.

By using sulfuric acid comprising up to 10% by weight of SO$_3$ and at temperatures from 0° to 40° C., preferably from 10° to 30° C., only the β-hydroxyethyl group is esterified to the β-sulfatoethyl group. By using sulfuric acid comprising 15 to 60% by weight of SO$_3$ and at temperatures from 20° to 100° C., preferably 40° to 80° C., the esterification is carried out in one step and the phenyl ring is sulfonated at least once.

The compounds of the formula (1) are precipitated, for example, by extraction by stirring on ice/water. The aqueous solutions of the alkali metal salts of the compounds of the formula (1) are obtained by neutralization with alkali metal hydroxide, phosphate, silicate, carbonate or bicarbonate. The dyestuffs can be isolated from this solution, for example, by salting out or by spray drying. Direct use of standardized aqueous formulations to which buffer substances are added if appropriate, and which may be concentrated if appropriate, for the corresponding application purposes is particularly advantageous.

Compounds of the formula (2) are, for example:
1-amino-4-bromo-, 1-amino-4-bromo-2-sulfo-, 1-amino-2, 4-dibromo-, 1-methylamino-2-carboxy-4-bromo-, 1-ethylamino- 2-carboxy-4-bromo-, 1-isopropylamino-2-carboxy-4-bromo-, 1-amino-4-bromo-2,6-disulfo-, 1-amino-4-bromo-2,7-di-sulfo-, 1-amino-4-bromo-2,5,8-trisulfo-, 1-propylamino-4-bromo-2-sulfo-, 1-amino-4-bromo-2-carboxy-, 1-amino-4-bromo-2-sulfo-6-carboxy-, 1-amino-4-bromo-2-sulfo-7-carboxy-, 1-methylamino-4-bromo-, 1-methylamino-4-bromo-2-sulfo-, 1-ethylamino-4-bromo-2-sulfo-, 1-(β-hydroxyethyl)amino-4-bromo-2-sulfo-, 1-phenylamino-4-bromo-2-sulfo-, 1-amino-2-bromo-4-nitro, 1-cyclohexylamino-4-bromo-, 1-benzoylamino-4-bromo-, 1-acetylamino-4-bromo-, 1-cyclohexylamino-4-bromo-5-sulfo-, 1-cyclohexylamino-4-bromo-6-sulfo-, 1-cyclohexylamino-4-bromo-7-sulfo- or 1-cyclohexylamino-4-bromo-8-sulfo-anthraquinone. 1-Amino-4-bromo-2-sulfo-anthraquinone is particularly preferred as the anthraquinone component. The anthraquinone compounds mentioned are known to the expert and are described, for example in Houben-Weyl, Volume 7/3c, 4th edition, page 46 et seq.

Compounds of the formula (3) are amino-phenol ethers (Y=oxygen) or diaminobenzenes (Y=NH). In the case where Y is oxygen, the compounds of the formula (3) are known from EP-A-0 355 492. In the case where Y is NH, the compounds of the formula (3) are known from EP-A-0 629 667.

Amino compounds of the formula (3) are, for example: 4-[3-(β-hydroxyethylsulfonyl)]-propoxy-aniline, 4- [3-(β-hydroxyethylsulfonyl)]-propoxy-aniline-3-sulfonic acid, 4-[3-(β-hydroxyethylsulfonyl)]-propoxy-aniline-2-sulfonic acid, 3-[3-(β-hydroxyethylsulfonyl)]-propoxy-aniline, 3-[3-(β-hydroxyethylsulfonyl)]-propoxy-aniline-4-sulfonic acid, 5-[3-(β-hydroxyethylsulfonyl)]-propoxy-aniline-2-sulfonic acid, 4-[2-(β-hydroxyethylsulfonyl)]-ethoxy-aniline, 4-[2-(β-hydroxyethyl-sulfonyl)]-ethoxy-aniline-3-sulfonic acid, 4-[2-(β-hydroxyethylsulfonyl)]-ethoxy-aniline-2-sulfonic acid, 3-[2-(β-hydroxyethylsulfonyl)]-ethoxy-aniline, 3-[2-(β-hydroxyethylsulfonyl)]-ethoxy-aniline-4-sulfonic acid, 5-[2-(β-hydroxyethylsulfonyl)]ethoxy-aniline- 2-sulfonic acid, N-[4'-aminophenyl]-3-(β-hydroxyethylsulfonyl)-propylamine, N-[4'-amino-3'-sulfophenyl]-3-(β-hydroxyethylsulfonyl)-propylamine, N-[4'-amino-3'-carboxyphenyl]-3-(β-hydroxyethylsulfonyl)propylamine, N-[4'-aminophenyl]-2-(β-hydroxyethylsulfonyl)-ethylamine, N-[4'-amino-3'-sulfophenyl]-2-(β-hydroxyethylsulfonyl)-ethylamine, N-[4'-amino-3'-carboxyphenyl]-2-(β-hydroxyethylsulfonyl)-ethylamine, N-[3'-aminophenyl]-3-(β-hydroxyethylsulfonyl)-propylamine, N-[3'-amino-4-sulfophenyl]-3-(β-hydroxyethylsulfonyl)propylamine, N-[3'-amino-4-carboxyphenyl]-3-(β-hydroxyethylsulfonyl)-propylamine, N-[3'-aminophenyl]-2-(β-hydroxyethylsulfonyl)-ethylamine, N-[3'-amino-4'-sulfophenyl]-2-(β-hydroxyethylsulfonyl)-ethylamine, N-[3'-amino-4'-carboxyphenyl]-2-(β-hydroxyethylsulfonyl)ethylamine, 4-[3-(β-sulfatoethylsulfonyl)]-propoxy-aniline, 4-[3-(β-sulfatoethylsulfonyl)]-propoxy-aniline-3-sulfonic acid, 4-[3-(β-sulfatoethylsulfonyl)]-propoxy-aniline-2-sulfonic acid, 3-[3-(β-sulfatoethylsulfonyl)]-propoxy-aniline, 3-[3-(β-sulfatoethylsulfonyl)]-propoxy-aniline-4-sulfonic acid, 5-[3-(β-sulfatoethylsulfonyl)]-propoxy-aniline-2-sulfonic acid, 4-[2-(β-sulfatoethylsulfonyl)]-ethoxy-aniline, 4-[2-(β-sulfatoethylsulfonyl)]-ethoxy-aniline-3-sulfonic acid, 4-[2-(β-sulfatoethylsulfonyl)]-ethoxy-aniline-2-sulfonic acid, 3-[2-(β-sulfatoethylsulfonyl)]-ethoxy-aniline, 3-[2-(β-sulfatoethylsulfonyl)]-ethoxy-aniline-4-sulfonic acid, 5-[2-(β-sulfatoethylsulfonyl)]-ethoxy-aniline-2-sulfonic acid, N-[4'-aminophenyl]-3-(β-sulfatoethylsulfonyl)propylamine, N-[4'-amino-3'-sulfo-phenyl]-3-(β-sulfatoethylsulfonyl)-propylamine, N-[4'-amino-3'-carboxyphenyl]-3-(β-sulfatoethylsulfonyl)-propylamine, N-[4'-aminophenyl]-2-(β-sulfatoethylsulfonyl)-ethylamine, N-[4'-amino-3'-sulfophenyl]-2-(β-sulfatoethylsulfonyl)-ethylamine, N-[4'-amino-3'-carboxy-phenyl]-2-(β-sulfatoethylsulfonyl)-ethylamine, N-[3'-aminophenyl]-3-(β-sulfatoethylsulfonyl)-propylamine, N-[3'-amino-4'-carboxyphenyl]-3-(β-sulfatoethylsulfonyl)-propylamine, N-[3'-amino-4'-carboxyophenyl]-3-(β-sulfatoethylsulfonyl)-propylamine, N-[3'-aminophenyl]-2-(β-sulfatoethylsulfonyl)-ethylamine, N-[3'-amino-4'-sulfophenyl]-2-(β-sulfatoethylsulfonyl) -ethylamine and N-[3'-amino-4'-carboxyphenyl]-2-(β-sulfatoethylsulfonyl)-ethylamine.

The compounds of the formula (1) have fiber-reactive properties and have very good dyestuff properties. They can be used for dyeing and printing materials, in particular fiber materials, containing hydroxyl, mercapto, amino and/or carboxamide groups. Brilliant blue color shades with outstanding fastness properties, such as fastness to light and fastness to chlorine water, are obtained without the need for complexing with metals. The dyestuffs according to the invention are thus ecologically advantageous.

The present invention therefore also relates to the use of the compounds of the formula (1) for dyeing and printing the materials mentioned. In this procedure, the compound of the formula (1) is applied to the material or incorporated into the material and fixed on or in the material by means of heat or with the aid of an agent having an alkaline action.

Examples of suitable materials are natural or regenerated cellulose materials, such as cotton, linen, viscose, rayon, chemically modified cellulose fibers, protein fibers, such as wool or silk, and synthetic polyamides, such as nylon or Perlon, all of which are adequately known to the expert.

Suitable application processes are, for example, the exhaustion process in winch vats, jets or continuous dyeing techniques. The dyestuffs according to the invention are particularly suitable for dyeing and printing cellulose materials using a short liquor application technique such as for textile printing or pad-dyeing processes, such as, for example, continuous processes.

The dyestuffs of the present invention are written in the form of their free acids in this description. However, they can also be used as salts of these acids. They are preferably used in their salt form, and particularly preferably in the alkali metal and alkaline earth metal salt form, such as, for example, as the Na, K or Li salts.

In the examples, percentage data are percentages by weight and parts are parts by weight. The stated absorption maxima (lambda max) in the visible range were determined with the aid of their alkali metal salts in aqueous solution.

EXAMPLE 1

38.2 parts of 1-amino-4-bromo-2-sulfo-anthraquinone (bromamine acid) are subjected to a condensation reaction in aqueous suspension with 27.2 parts of 4-[3-(β-hydroxyethylsulfonyl)]-propoxy-aniline, known from EP-A-0 355 492, with addition of 1 part of copper(I) chloride at a pH of 8.5 and a temperature of 70° C. for 3 hours. A dark blue solution is formed in this reaction. After cooling to 20° to 25° C., insoluble constituents are filtered off, the filtrate is acidified to pH 1 with sulfuric acid and stirred for some time and the dyestuff which has precipitated out is isolated by filtration with suction. 65 parts of a dyestuff of the formula

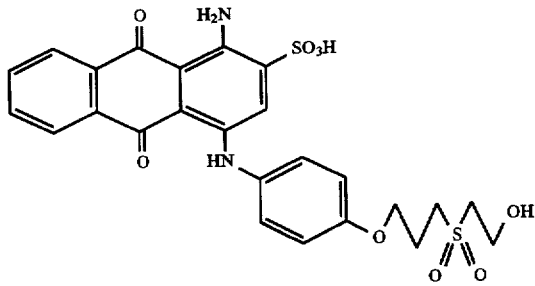

are obtained.

The filter cake is dried and introduced into about 200 parts of 100% strength sulfuric acid in a manner such that the temperature does not rise above 40° C., and the mixture is stirred for some time and a further 10 parts of 20% strength oleum are added. The mixture is further stirred for some time until the reaction has ended, and the resulting solution is then stirred into ice-water, brought to pH 2 with sodium carbonate and then filtered with suction, and the moist filter cake is again dissolved in water with sodium carbonate at pH 5, a deep blue solution being obtained, from which 63 parts of the dyestuff of the formula

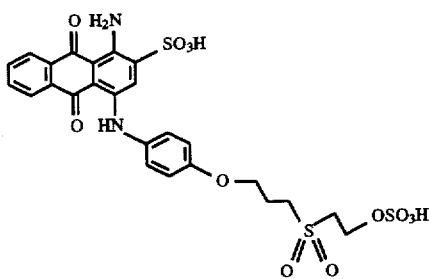

blue (598 nm)

are obtained with a purity of 93%, according to HPLC, by salting out with NaCl or, preferably, by evaporation in vacuo. The dyestuff dyes and prints cellulose fibers in brilliant blue color shades with good depth of color coupled with a good levelness and very good fastness properties, of which the light-fastness is to be singled out in particular.

EXAMPLE 2

65 parts of the β-hydroxyethylsulfonyl intermediate from Example 1 are introduced in the dried state into about 250 parts of 20% strength oleum in a manner such that the temperature does not rise above 40° C. The reaction is then continued further for a while at 45°–50° C., with stirring. The oleum-containing mass is then stirred on ice-water at 0° to 15° C., brought to pH 1.5 with Ca carbonate, subsequently brought to pH 5 with Na carbonate and filtered. The calcium sulfate formed is filtered off to give a deep blue solution, from which 71 parts of the dyestuff of the formula

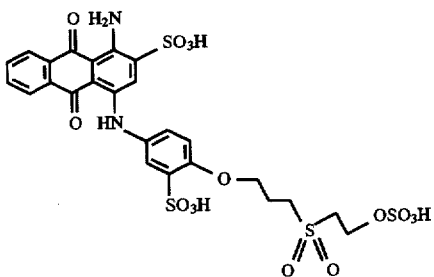

blue (598 nm)

are obtained with a purity of 89%, according to HPLC, by evaporation in vacuo. The dyestuff dyes and prints cellulose fibers in brilliant blue color shades with good depth of color coupled with a good levelness and very good fastness properties, of which the light-fastness is to be singled out in particular.

EXAMPLE 3

38.2 parts of 1-amino-4-bromo-2-sulfo-anthraquinone (bromamine acid) are subjected to a condensation reaction in aqueous suspension with 27.2 parts of 4-[3-(β-hydroxyethylsulfonyl)]-propyl-amino-aniline with addition of 1.2 parts of copper(I) chloride at a pH of 8 to 8.5 and a temperature of 65° to 70° C. for 2 to 3 hours. A dark blue solution is formed by this procedure. After cooling to 20° to 25° C., insoluble constituents are filtered off, the filtrate is acidified with sulfuric acid and the dyestuff which has precipitated out is isolated by filtration with suction. The filter cake is dried, ground and then introduced into 200 parts of 100% strength sulfuric acid in a manner such that the temperature does not rise above 40° C. Ice-water is added to the reaction product, the mixture is then filtered, and the precipitate is dissolved again in water with sodium carbonate at pH 5, a deep blue solution being obtained, from which 63 parts of the dyestuff of the formula

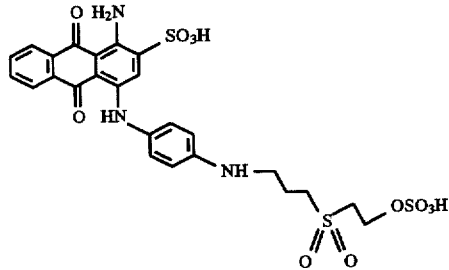

blue (602 nm)

are obtained with a purity of 88%, according to HPLC, by salting out with NaCl or, preferably, by evaporation in vacuo. The dyestuff dyes and prints cellulose fibers in brilliant blue color shades with good depth of color coupled with a good levelness and very good fastness properties, of which the light-fastness is to be singled out in particular.

EXAMPLE 4

38.2 parts of 1-amino-4-bromo-2-sulfo-anthraquinone (bromamine acid) are subjected to a condensation reaction in aqueous suspension with 27.2 parts of 4-[3-(β-hydroxyethylsulfonyl)]-propyl-amino-aniline with addition of 1.2 parts of copper(I) chloride at a pH of 8.5 and a temperature of 70° C. for 3 hours. A dark blue solution is formed by this procedure. After cooling to 20° to 25° C., insoluble constituents are filtered off, the filtrate is acidified with sulfuric acid and the dyestuff which has precipitated out is isolated by filtration with suction. The filter cake is dried, ground and then introduced into 200 parts of 20% strength oleum in a manner such that the temperature does not rise above 40° C. The mixture is then stirred at 60° C. for some time until the reaction has ended. Ice-water is added to the reaction product, the mixture is then filtered, and the precipitate is dissolved again in water with sodium carbonate at pH 5, a deep blue solution being obtained, from which 70 parts of the dyestuff of the formula

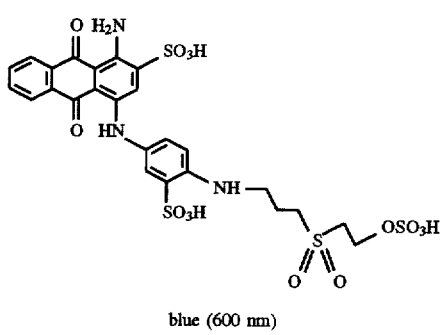

blue (600 nm)

are obtained with a purity of 91%, according to HPLC, by salting out with KCl or, preferably, by evaporation in vacuo. The dyestuff dyes and prints cellulose fibers in brilliant blue color shades with good depth of color coupled with a good levelness and very good fastness properties, of which the light-fastness is to be singled out in particular.

EXAMPLE 5

38.2 parts of 1-amino-4-bromo-2-sulfo-anthraquinone (bromamine acid) are subjected to a condensation reaction in aqueous suspension with 41 parts of 4-[3-(β-sulfatoethylsulfonyl)]-propyl-amino-aniline with the addition of 2 parts of copper(I) chloride at a pH of 7.8 to 8.2 and a temperature of 70° C. for 4 hours. A dark blue solution is formed by this procedure. After cooling to 20° to 25° C., insoluble constituents are filtered off, the resulting deep blue solution is brought to pH 5 by addition of dilute sulfuric acid and the reaction product is isolated by salting out with NaCl or, preferably, by evaporation in vacuo. The dyestuff of the formula

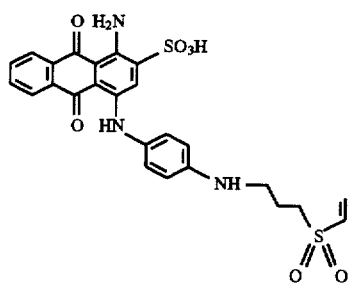

blue (601 nm)

is obtained with a purity of 74%, according to HPLC. The dyestuff dyes and prints cellulose fibers in brilliant blue color shades with good depth of color coupled with a good levelness and very good fastness properties, of which the light-fastness is to be singled out in particular.

Further valuable fiber-reactive dyestuffs of the following formula are obtained if the amines of the formula T-NH$_2$ shown in the table are used for reaction with 1-amino-4-bromo-2-sulfo-anthraquinone and the syntheses are carried out analogously to the abovementioned examples.

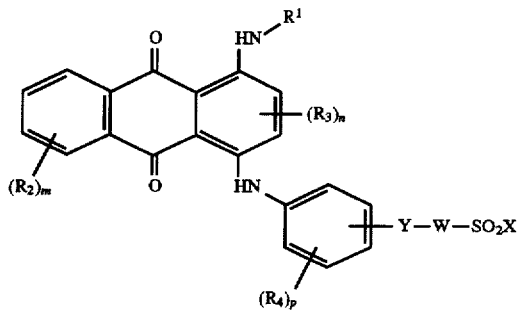

| Example No. | Amine T-NH$_2$ | Color shade on cotton |
|---|---|---|
| 6 | 4-(2'-β-Sulfatoethylsulfonyl)-ethoxy-aniline | blue (602 nm) |
| 7 | 3-Sulfo-4-(2'-β-sulfatoethyl-sulfonyl)-ethoxy-aniline | blue (599 nm) |
| 8 | 2-Sulfo-4-(2'-β-sulfatoethyl-sulfonyl)-ethoxy-aniline | blue (612 nm) |
| 9 | 2-Sulfo-4-(3'-β-sulfatoethyl-sulfonyl-propyl)-amino-aniline | blue (600 nm) |
| 10 | 4-Sulfo-3-(3'-β-sulfatoethyl sulfonyl-propyl)-amino-aniline | blue (600 nm) |
| 11 | 2-Sulfo-5-(3'-sulfatoethyl-sulfonyl-propyl)-amino-aniline | blue (602 nm) |

We claim:

1. An anthraquinone compound of the formula (1)

in which
R$^1$ is hydrogen, C$_1$-C$_6$-alkyl-carbonyl, C$_6$-aryl-carbonyl, C$_1$-C$_4$-alkylphenylcarbonyl, C$_1$-C$_6$-alkyl, C$_3$-C$_6$-cycloalkyl or phenyl, where C$_1$-C$_6$-alkyl, C$_3$-C$_6$-cycloalkyl and phenyl are optionally substituted by one or more radicals from the group consisting of hydroxyl, sulfo, carboxyl, C$_1$-C$_4$-alkyl, C$_1$-C$_4$-alkoxy, halogen, cyano, amino and nitro;
R$^2$ is sulfo or carboxyl;
m is a number from 0 to 2;
R$^3$ is sulfo, carboxyl or halogen;
n is the number 0 or 1;
R$^4$ is sulfo, carboxyl, C$_1$-C$_4$-alkyl or C$_1$-C$_4$-alkoxy;
p is a number from 0 to 2;
W is a C$_1$-C$_6$-alkylene group;
X is vinyl or —CH$_2$CH$_2$—L, in which L is a group which can be split off under alkaline conditions and is selected from the group consisting of chlorine, bromine, —OSO$_3$M, —SSO$_3$M or —OP$_3$M$_2$, in which M is hydrogen or an alkali metal;

Y is a bridge member of the formula —O— or —NH—
with the proviso that W is a $C_3$–$C_6$-alkylene group if X is vinyl and at the same time Y is —NH—.

2. An anthraquinone compound as claimed in claim 1, in which

R$^1$ is hydrogen, $C_1$–$C_4$-alkyl, $C_5$–$C_6$-cycloalkyl, acetyl, benzoyl, phenyl or methylphenyl-carbonyl, or $C_1$–$C_4$-alkyl, $C_5$–$C_1$-cycloalkyl or phenyl which are substituted by 1 to 3 radicals from the group consisting of hydroxyl, sulfo, carboxyl, methyl, ethyl, methoxy, ethoxy, fluorine, chlorine, bromine, cyano or nitro.

3. An anthraquinone compound as claimed in claim 1, in which R$^3$ is chlorine, bromine or a sulfo group in the ortho-position relative to the NH—R$^1$ group.

4. An anthraquinone compound as claimed in claim 1, in which W is $C_2$–$C_3$-alkylene.

5. An anthraquinone compound as claimed in claim 1, in which m is the number 0;
n is the number 1 and
p is the number 0 or 1.

6. An anthraquinone compound as claimed in claim 1, in which the radical —Y—W—SO$_2$X is in the meta- or para-position relative to the NH group of the phenyl ring.

7. An anthraquinone compound as claimed in claim 1, which has the formula (1a) or (1b)

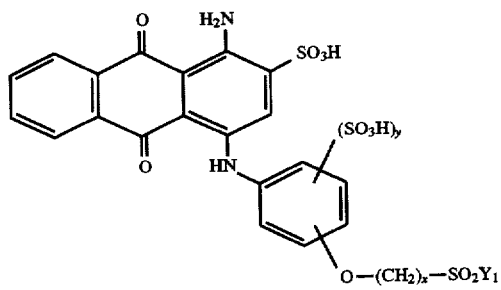
(1a)

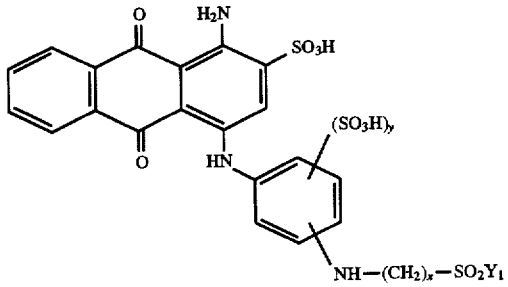
(1b)

in which x is the number 2 or 3;
y is 0, 1 or 2; and
Y$^1$ is β-sulfatoethyl, β-chloroethyl or vinyl with the proviso for the compound of the formula (1b) that if Y$_1$ is vinyl x is the number 3.

8. A compound of the formula (4)

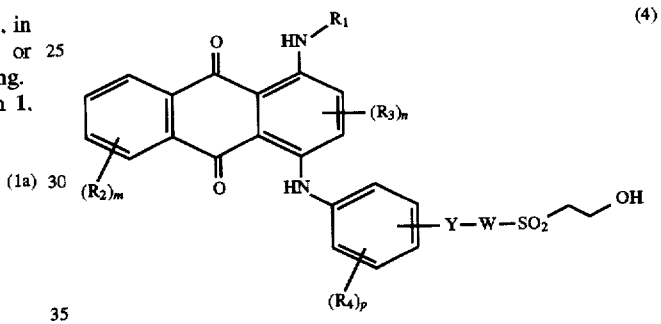
(4)

in which R$^1$, R$^2$, R$^3$, R$^4$, W, Y, m, n and p have the meanings given in claim 1.

* * * * *